United States Patent [19]

Feilchenfeld

[11] 4,356,390

[45] Oct. 26, 1982

[54] OPTICAL PATH MONITORING CIRCUIT FOR A DOCUMENT SCANNER

[75] Inventor: Michal M. Feilchenfeld, Pittsburgh, Pa.

[73] Assignee: Westinghouse Electric Corp., Pittsburgh, Pa.

[21] Appl. No.: 242,755

[22] Filed: Mar. 11, 1981

[51] Int. Cl.³ .............................................. G06K 9/00
[52] U.S. Cl. ......................... 235/455; 340/146.3 AG; 235/435
[58] Field of Search ............. 340/146.3 AG; 235/435, 235/455; 250/566, 567

[56] References Cited

U.S. PATENT DOCUMENTS 3,747,066  7/1973  Vernot et al. ............ 340/146.3 AG Primary Examiner—Harold I. Pitts
Attorney, Agent, or Firm—M. P. Lynch

[57] ABSTRACT

The light levels reflected from a predetermined blank portion of an optically scanned document are monitored. The presence of dirt or smudges in the optical path which could adversely affect the validity of the information read from the document.

2 Claims, 3 Drawing Figures

OPTICAL PATH MONITORING CIRCUIT FOR A DOCUMENT SCANNER

BACKGROUND OF THE INVENTION

Optical mark and optical character readers, which employ line scan cameras having an array of photosensitive elements, develop analog output signals on a line by line basis of a scanned document. These signals provide an indication of the presence or absence of characters or marks on the basis of light reflection from, or transmission through, the document.

The black/white signature of a scan line, or sweep of a line scan camera, across a document, such as a student's test answer sheet, produce an analog output signal from the camera. The analog signal is typically applied to a comparator circuit and a video normalizer circuit to initially provide a black level compensation and to determine the level of the discrete picture elements (pixels) of the analog signal derived from the individual photosensitive elements of the line scan camera. The analog output signals are supplied to an analog to digital converter which generates a digital output signal identifying the grey level of each picture element.

The utilization of a line scan camera and digital signal processing circuitry for deriving intelligence from a document is described in detail in pending U.S. patent application Ser. No. 000,457, filed Jan. 2, 1979, entitled, "Optical Reading System" by J. V. McMillin and D. W. Schroeder, which is assigned to the assignee of the present invention and incorporated herein by reference.

SUMMARY OF THE INVENTION

During the lengthy operation of an optical reader system, its optical and transport system are exposed to dust and dirt contamination. In this case spurious signals may be generated, which can distort the data accumulation process. The presence of any dirt or smudge in the optical path of an optical system can produce spurious signals equivalent to black markings extending over the entire vertical extent of a scanned document. In this case all scan lines will show a black marking. The same effect will be observed if the scanned document contains a black line due to misprint, doodling or smudge, extending over the entire length of the document. These conditions will not be possible if at least one totally white line of the document is detected during the scanning process.

There is disclosed herein with reference to the accompanying drawings a circuit technique for an optical reader system whereby the signal level of a predetermined number of scan lines in a blank portion of a document is monitored to determine the presence of dirt or a smudge in the field of view of the camera. The presence of such dirt or smudges, if not identified as such, could seriously affect the accuracy and validity of the information transferred from the document to information processing equipment. The technique disclosed is accomplished by detecting and counting a prescribed number of white lines present within predetermined white areas of the document. The white areas are document areas where no marking or preprinted information is present, i.e., the top and bottom sections of the document. If the prescribed number of white lines are not detected during the document scan, an alert signal is transmitted to the information processing circuitry to indicate the presence of dirt or smudges which could adversely affect the interpretation of the document information being read.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
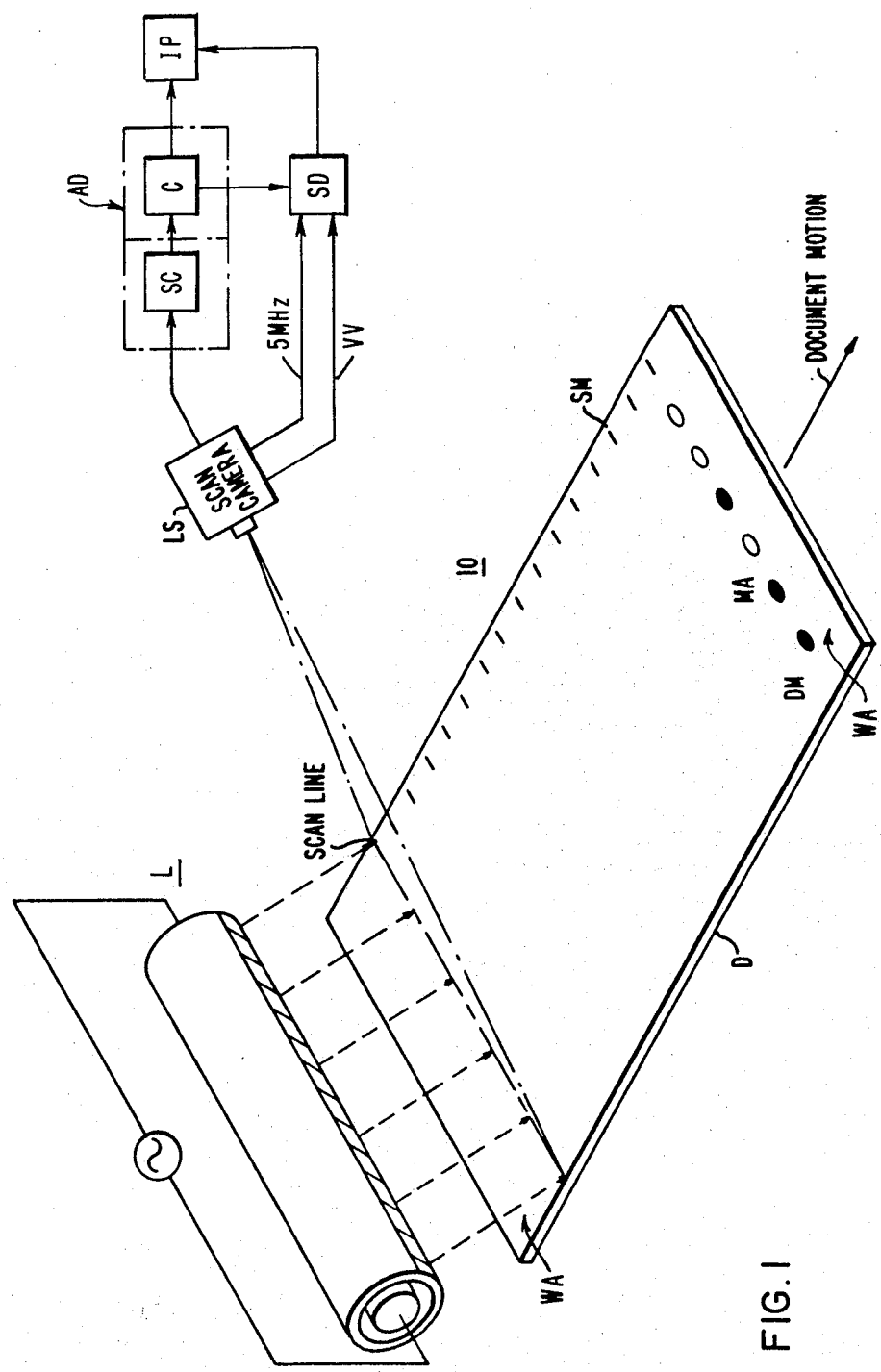
FIG. 1 is a block diagram schematic illustration of a document scanning system employing the invention.

Referring to FIG. 1 there is illustrated an optical reading system employing a line scan camera LS which scans the moving document D which is illuminated by the light source L. The line scan camera LS can be suitably implemented through the use of commercially available line scan camera systems such as the Fairchild Model CCD 1300 which includes a 1024 element charge coupled device as its sensor. The 1024 element charge coupled device module of the line scan camera LS detects the optical information corresponding to the illuminated line of the moving document D and produces an analog waveform which is proportional to the brightness of the image of the data. This data is subsequently shifted out from the camera LS at a given clock rate. The use of the 1024 element charge coupled line array of photosensitive devices as a video pickup provides a high resolution read out of 100 picture elements (pixels) per inch. The document D exhibits a document format having a vertical scan track area ST of scan marks SM in a pattern of data entry mark areas MA, as in a test scoring answer sheet, suitable for accepting a data mark DM typically produced by filling in a mark area MA with a grapite pencil.

Under the operation of the line scan camera LS, each mark area MA consists of a plurality of scan points or picture elements, i.e. pixels, as defined by the photosensitive elements of the line scan camera LS. The motion of document D in the vertical direction exposes successive lines of the document to the line scanning camera LS. Thus the operation of the camera coupled with the vertical movement of the document D perpendicular to the camera sweep line generate the equivalent of a raster-scanning capability such as that present in CRT displays. Typically, the video information is shifted out of the line scan camera LS at a 5 MHz rate.

The optical information derived from each pixel, or scan point, by the line scanning camera LS is transmitted as an analog signal to the signal conditioning circuit SC. The signal conditioning circuit SC normalizes the base line and the analog-to-digital converter circuit AD converts each analog signal representing a pixel into a two bit digital signal allowing four levels of gray scale for each pixel. The circuit AD employs comparator circuits C for comparing the analog signal from the line scan camera LS to a reference signal corresponding to a predetermined gray level. One of the outputs of the comparator circuits C is applied to the optical path monitor circuit SD which is employed to alert the information processing circuit IP as to the presence of dirt or smudges within the optical path of the optical reader system.

Figure 2:
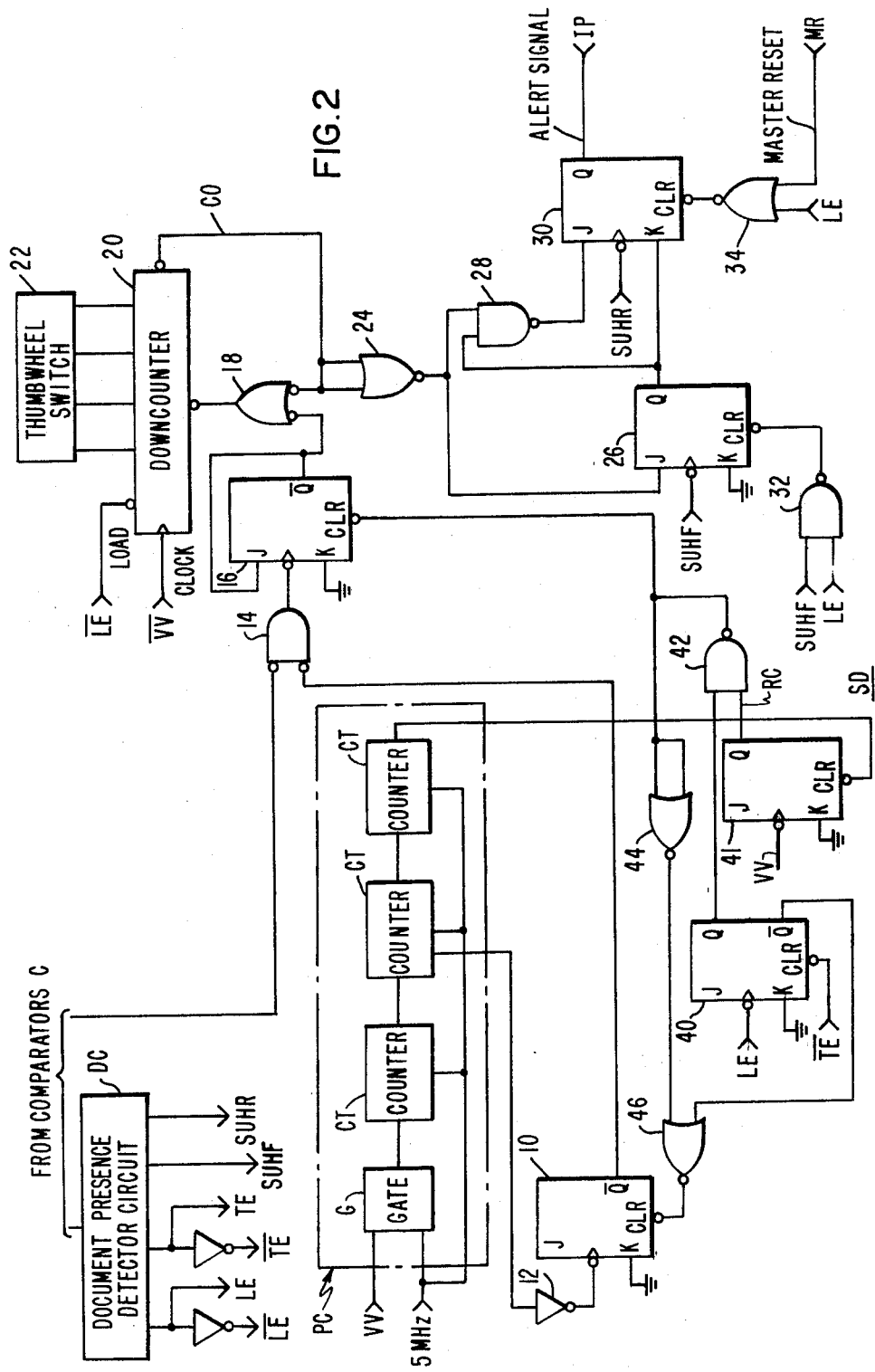
FIG. 2 is a schematic illustration of a circuit implementation of the invention.
Figure 3:
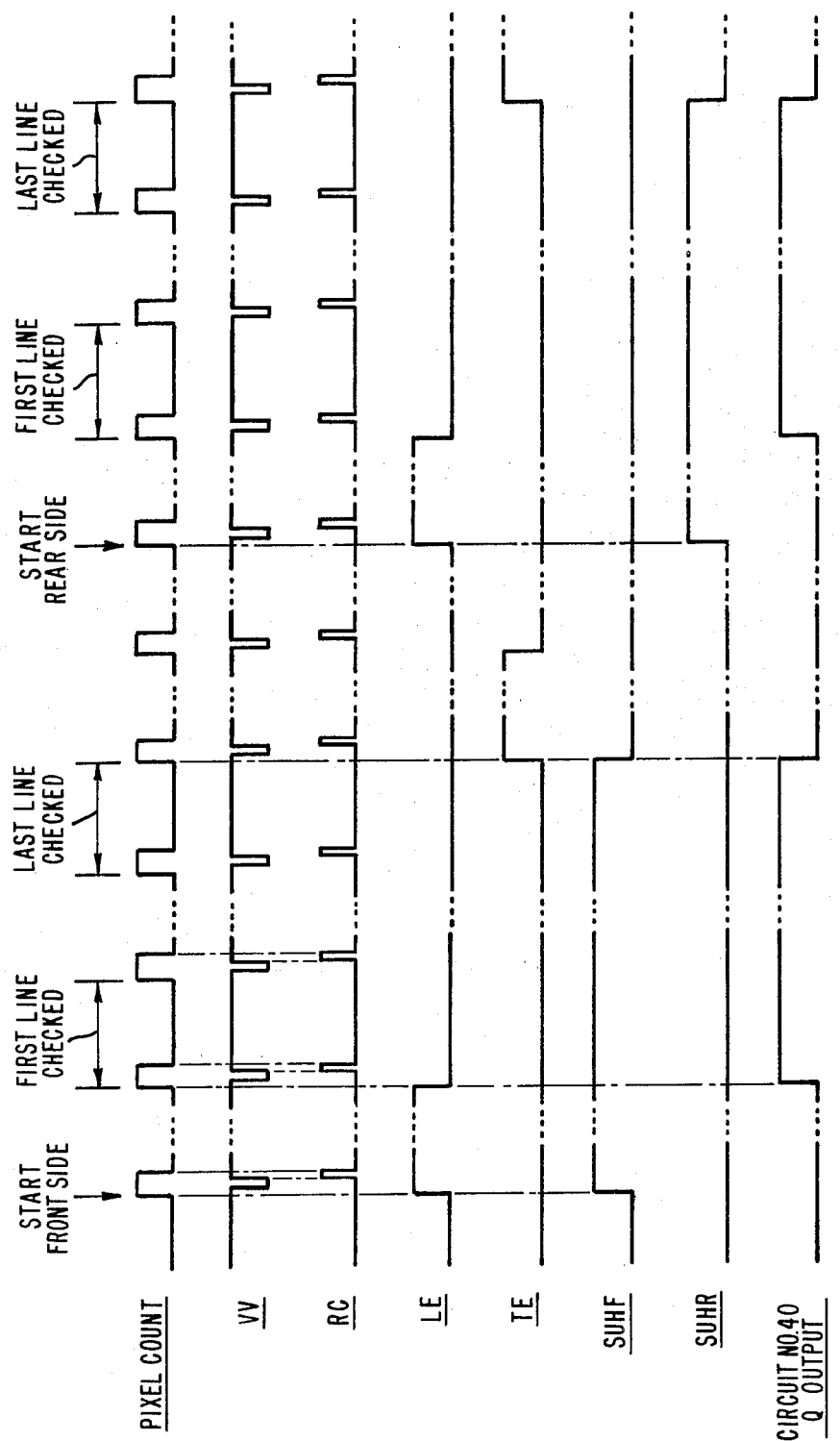
FIG. 3 is a timing diagram for the operation of the circuit of FIG. 2.

A detailed schematic implementation of the circuit SD of FIG. 1 is illustrated in FIG. 2. The document presence detector circuit DC responds to the output from the comparator circuits C of the analog to digital converter AD of FIG. 1 by providing output signals indicative of the presence of a document passing under the line scan camera LS. These output signals consist of a signal indicative of the presence of a leading edge of the document LE, a signal indicative of the trailing edge of the document TE, and signals SUHF and SUHR which continuously provide an indication of the presence of the front side or rear side of the document while it is passing under the line scan camera LS. In those optical scanning systems wherein only one side of the document is scanned only one such signal would be required. However, in many of the systems, such as that represented in the circuit embodiment of FIG. 2, wherein the scanning of the first side, or front of the document, is followed by a scanning of the reverse side, or rear of the document, the signal SUHF indicates when the front side of the document is passing under the line scan camera and the signal SUHR indicates when the rear side of the document is passing under the line scan camera LS. Basically, the document presence detector circuit DC distinguishes between the presence or absence of a document surface as contrasted with the document background surface under the camera LS on the basis of the amount of light reflected to the camera LS from the surface. The implementation of circuit DC typically consists of several J/K-type flip-flop circuits controlled by the output of the comparator circuits C and clocked by the pixel count signal. These signals, as well as the video valid signal VV generated by the line scan camera LS for each scan line of the camera, are illustrated in the timing diagram of FIG. 3.

A pixel counter PC which may typically consist of a twelve bit counter comprised of three counters CT (74LS161 LS161) and an input gating circuit G (74LS74A) respond to the 5 MHz clock signal and video valid signal VV to develop an absolute count of the pixels of a document scan. A count signal corresponding to a predetermined number of pixel elements, representing a document margin delay, as measured from the side edge of the document D is employed as a clock input to the J-K type flip flop circuit 10 (74LS112) via the inverter circuit 12. The output of the flip flop circuit 10 is supplied as an enabling input of the NAND gate 14 which has as a second input a document gray logic level signal GL, which is a logic 1 or logic 0, supplied from the comparator circuits C of the analog to digital converter circuit AD. Assuming there are no smudges or dirt, the scan lines within a white area WA, or blank portion of the document D of FIG. 1 will be totally white as evidence by the logic level signal GL. Under these conditions there is no output from the NAND gate 14 to clock the JK flip flop circuit 16 (74LS112). Furthermore, the output of the flip-flop circuit 16 enables the downcounter 20 via the NOR gate 18. The clock signal supplied to the down counter circuit 20 is the video valid signal VV developed by the line scan camera LS. The leading edge signal LE from the detector circuit DC serves to load a predetermined count value in the down counter 20 from circuit 22. This count value corresponds to the number of scan lines of the document D which is considered acceptable in verifying the presence or absence of a smudge or dirt. While the down counter 20 is enabled (which is indicative of the presence of totally white lines) each video valid signal VV, which occurs once per scan line, clocks the down-counter 20 by one digit. Thus if the down counter 20 is preloaded with information from circuit 22 corresponding to, for example, eight scan lines, and no smudge or dirt appear during the eight line scan interval the down-counter 20 will count down to zero, and a borrow output signal CO is generated which disables the down counter 20 from further counting via the NOR gate 18. The output signal CO is supplied through the inverter circuit 24 as an input signal to both: the J-K flip flop circuit 26 and the NAND gate circuit 28.

Recognizing that in many optical scanning operations both the front and rear sides of the document are scanned, it is assumed that the above indication of eight white lines resulted from scanning a blank document section at the top of the front of the document. The clock input signal to the flip flop circuit 26 corresponds to signal SUHF developed by the document detector circuit DC. This signal indicates the presence of the front side of the document D under the line scan camera LS. The trailing edge of signal SUHF clocks the flip flow circuit 26 and circuit 26 changes state. In accordance with the logic arrangement shown, the above described operation will result in a logic one level input to the NAND gate 28 from the inverter 24 and a logic one input to the NAND gate 28 from the output of the flip flop circuit 26. The document is then reversed and the rear side of the document is transported for viewing by the line scan camera LS. A typical implementation of apparatus for reversing the document for reading on both sides is described in detail in U.S. Pat. No. 3,646,325 which is assigned to the assignee of the present invention and incorporated herein by reference.

The above-described checking process is repeated and if no dirt or smudges are found, i.e., a predetermined number of white lines has been detected, both inputs to NAND gate 28 are at logic 1. This is caused by the J/K flip flop circuit 26 being maintained in its clocked state (not cleared, as signal SUHF is a logic 0) and by the inverted borrow signal CO. The J input of J/K flip flop circuit 30 is a logic 0, while its K input is a logic 1. Under these conditions when the J/K flip flop circuit 30 is clocked by the trailing edge of signal SUHR, its Q output remains in a stable logic 0 state. If however, the prescribed number of white lines, i.e. 8, are not detected, the absence of the borrow signal CO from down counter 20 during the scanning of the rear side of the document causes the J input of flip flop 30 to be in a logic 1 state and the flip flop circuit 30 changes state when clocked by signal SUHR. Similarly, if the prescribed number of white lines is not detected when the front side of the document is examined, the J/K flip flop circuit 26 will not change state when clocked by signal SUHF and the prevailing conditions on the inputs to J/K flip flop circuit 30 (J=1; K=0) will result in the change of state for the J/K flip flop circuit 30 when clocked by signal SUHR. This will happen irrespective of whether the prescribed number of white lines on the rear side was detected or not. The combination of the flip flop circuits 26, 30 and NAND gate 28 acts as an AND gate maintaining no alert state only when the described number of white lines has been detected on both sides of the document. In all other circumstances an alert signal is generated.

The flip flop circuit 26 is cleared via the NAND gate 32 in response to the presence of input signal LE and the signal SUHF. The flip flop circuit 30 is cleared via NOR gate 34 which has its inputs the signal LE and a master reset signal MR which may originate in the scanning control circuitry or may be implemented manually.

In the operation described above, the flip flop circuit 10 remains cleared between the occurrence of the trailing edge signal TE of one document, or document side, and the leading edge signal LE of a second document side, or subsequent document, by the operation of the flip flop circuit 40. This time interval corresponds to the gaps existing between subsequent documents as well as the time between the completion of the scanning of the front side of the document and the beginning of the scanning of the rear side of the document.

The flip flop circuit 40 operates in conjunction with the NAND gate 42, inverter 44 and NOR gate 46 as the clearing circuit for both the flip flop circuits 10 and 16. The leading edge signal LE clocks the flip flop circuit 40. The Q output of the flip flop circuit 40 is supplied as a first input to the NAND gate 42, with the second input being signal RC from J/K flip-flop circuit 41 which occurs between scan lines of the document D. The output of the NAND gate 42 directly clears the flip flop circuit 16. The output of a NAND gate 42 is also supplied as an input to the NOR gate 46 via the inverter circuit 44. A second input to the NOR gate 46 is the $\overline{Q}$ output of the flip flop circuit 40. The operation of the flip flop circuit 40 and the NOR gate 46 functions to disable, or block, the operation of the flip flop circuit 10 to prevent activation of optical path monitoring circuit SD during time periods between the presence of successive documents or during the time the document is being reversed from the front to the rear side for viewing by the line scan camera LS.

What I claim is:

1. In a document reading system employing an optical means for scanning information on a line-by-line basis from the surface of a document and generating a first output signal indicative of the level of light reflected from, or transmitted through the document for each scan line, and a second output signal indicative of the occurrence of each scan line, the improvement for alerting the system as the presence of dirt, smudges, etc. in the optical path of the optical means which could adversely affect the validity of information received by the system, said improvement comprising, first circuit means for developing output signals indicative of the presence of a document within the view of said optical means, second circuit means for designating a predetermined number of document scan lines within a blank portion of the document surface to provide a basis for monitoring the optical path of the system, and third circuit means operatively connected to said first and second means for monitoring the level of the output signal of said optical means for said predetermined number of document scan lines and developing a first output signal when the output signal of said optical means for each of said predetermined number of document scan lines is of a level indicative of the absence of dirt, smudges, etc. in the optical path, and developing a second output signal when the output signal of said optical means for one or more of said predetermined number of document scan lines is of a level indicative of the presence of dirt, smudges, etc. in the optical path, said second output signal being provided to said system to alert said system as to the presence of dirt, smudges, etc. in the optical path of said optical means.

2. In a system as claimed in claim 1 wherein said first means develops a leading edge signal in response to the entry of the document within view of said optical means, said third circuit means including a downcounter means, said leading edge signal causing the information corresponding to said predetermined number of document lines to be loaded from said second circuit means into said downcounter means, said second output signal of said optical means clocking said downcounter means, and fourth circuit means connected between said optical means and said third circuit means for monitoring the level of said first output signal of said optical means and generating a first logic state condition when said first output signal indicates the absence of any document mark, smudges or dirt and a second logic state condition when said first output signal indicates a document mark, smudges or dirt, said first and second logic state conditions serving as an enable input to said downcounter, the presence of said first logic state condition as an enable input throughout the clocking of said downcounter means for said predetermined number of scan lines resulting in a first output signal from said third circuit means, the presence of said second logic state as an enable during the clocking of said downcounter means for one or more of said predetermined number of lines resulting in a second output signal from said third circuit means.

* * * * *